Sept. 1, 1931.  E. L. BALLEW  1,821,786
RACING APPARATUS
Filed July 15, 1927
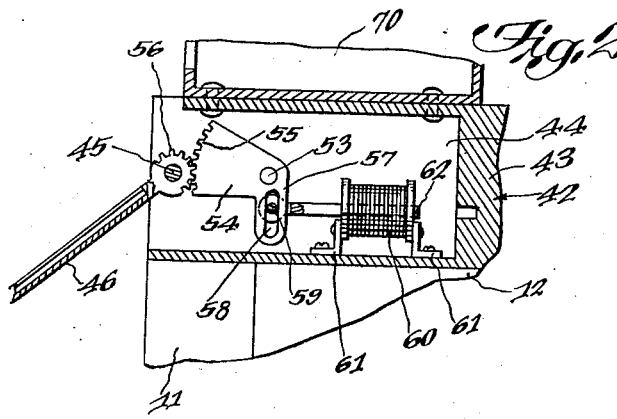
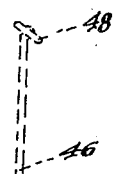
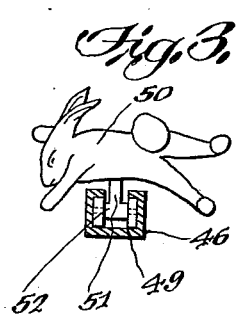
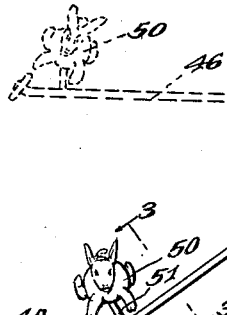
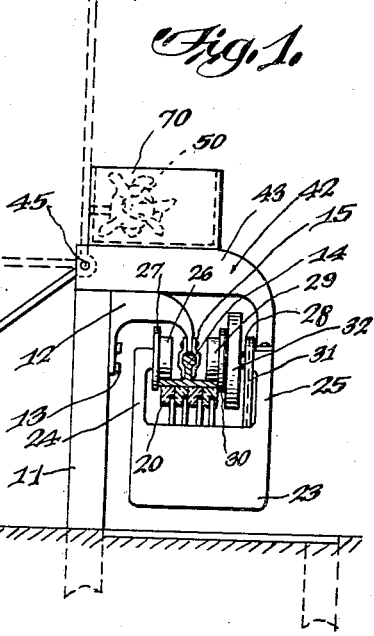
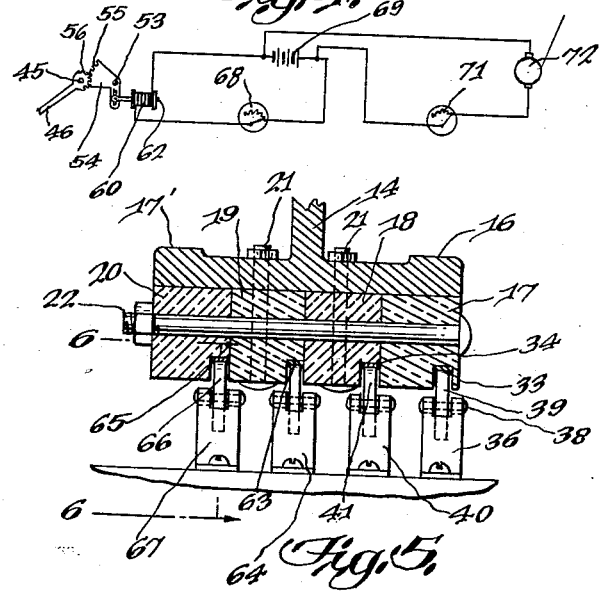
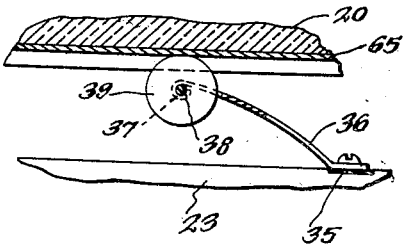
Elmer L. Ballew
INVENTOR
BY Victor J. Evans
ATTORNEY Patented Sept. 1, 1931

1,821,786

UNITED STATES PATENT OFFICE

ELMER L. BALLEW, OF CHICAGO, ILLINOIS

RACING APPARATUS

Application filed July 15, 1927. Serial No. 206,096.

This invention relates to certain novel improvements in racing apparatus and is particularly adapted to improvements in such apparatus such as used to propel a lure around a racing course which serves to induce animals to pursue it.

A device of the foregoing type is described and claimed in my co-pending application, Serial No. 201,432, filed in the U. S. Patent Office on or about June 25, 1927, and this device constitutes certain improvements over the apparatus described therein.

Devices of the prior art employed to propel a lure around the course have been arranged so as to travel over the course. This entailed an obvious disadvantage since it sometimes occurred that the animals caught the device and were in danger of being injured by coming in contact with the lure propelling mechanism. It is therefore among the objects of my invention to provide a lure propelling device which may be mounted so as to travel interiorly of the fence which defines the course.

Lure propelling devices of the prior art have been such that it was difficult to cause the lure to travel over hurdles and other obstacles placed in the course in order to induce the animals to leap over such hurdles and obstacles. Therefore a further object of the invention is to construct the device in such a way that the lure may be caused to travel over hurdles and other obstacles in the course.

A still further object of the invention is to arrange the device so that the lure may be concealed when it is desired to terminate the race.

A still further object of the invention is to arrange the device in such a way that it may be electromagnetically controlled.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is an elevational view looking at the device in the direction of the course of travel;

Fig. 2 is a detail view of the specific means employed to elevate the lure over hurdles and other obstacles as well as to conceal the lure at the termination of the race.

Fig. 3 is a detail view of the lure and the mounting therefore taken substantially on the plane of the line 3—3 of Fig. 1;

Fig. 4 is a schematic view of the electric circuit employed in the device;

Fig. 5 is a detail view of the track structure employed in the device; and

Fig. 6 is a sectional detail view taken substantially in the plane of the line 6—6 on Fig. 5.

A complete disclosure of the race course and other appurtenances with which the device herein described is adapted to be used is made in my hereintofore referred to co-pending application. The course 10 is defined by fences, the iner one of which is indicated by 11 in the drawings. Suitable brackets such as 12 are provided which are secured to the fence 11 by the securing elements such as the bolts 13. The brackets 12 extend in a direction away from the course and are adapted to support the track structure 14 which is secured to brackets 12 by clamping structures such as 15. In Fig. 5 it may be seen that the track structure 14 includes track portions 16 and 17' which are disposed on the upper side thereof near the edges. Disposed below the track section 14 are insulating blocks 17, 18, 19, and 20. The insulating blocks 18 and 19 are secured to the track 14 by suitable securing elements such as the bolt and nut structures 21. The blocks 17 and 21 are secured to the blocks 18 and 19 by bolt and nut structures 22 which extend at right angles to the bolt and nut structures 21.

A lure propelling mechanism includes a carriage 23 which has upwardly protruding arms 24 and 25. Suitably mounted on the arm 24 is the wheel 26 which has a flange portion 27 that is adapted to prevent side movement of the carriage 23. The wheel 26 is adapted to travel on the track portion 17' of the track structure 14. A shaft 28 is journaled in the upper end of the arm 25 and carries a wheel 29 that has a flange 30 similar to the flange 27. The wheel 29 is adapted to travel on the track portion 16 of the track structure 14. In the lower part of the carriage 23 a suitable motive means such as an electric motor is provided. Suitable connection is made between the motive means and the shaft 28 such as the chain belt and sprocket construction 31. A fly wheel 32 is mounted on the shaft 28 for purpose well understood in the art.

Suitable trolleys 33 and 34 are mounted in recessed portions of the blocks 17 and 18. On the carriage 23 an insulating strip 35 is mounted. Secured to the carriage 23 and insulated therefrom by the insulating strip 35 is a bracket 36 which is bifurcated at its outer end and which includes clamping portions 37 that are arranged to provide bearings for a shaft 38 on which the trolley wheel 39 is rotatably mounted. The trolley wheel 39 is adapted to engage the trolley 33. A bracket 40 is provided which is mounted in a manner similar to the bracket 36 and said bracket 40 is arranged substantially similar to the bracket 36 and carries a trolley wheel 41 that is adapted to engage the trolley 34. These trolleys and their cooperating structures are adapted to convey current to the heretofore mentioned motive means. Operation of the motive means is conveyed to the shaft 28 by means of the power transmitting structure 31 and thence to the wheel 29 which causes the device to be propelled around the track structure 14 which is disposed contiguous the race course 10.

Secured to the arm 25 is an upwardly protruding bracket 42 which has a horizontally disposed portion 43 that is adapted to be disposed over the fence 11. The portion 43 is arranged so as to embody the hollowed out portion 44 at the outer end thereof which is disposed over the fence 11.

Mounted in the hollowed out portion 44 near the open end thereof is a shaft 45. Secured to the shaft 45 and extending outwardly therefrom is the lure carrying arm 46 which is arranged so as to embody a cross section substantially similar to that illustrated in Fig. 3. In operation, the lure carrying arm 46 protrudes downwardly and at its outer end it carries the portion 47 which is disposed angularly with respect to the main extent of the arm 46 and extends horizontally when the arm 46 is in lowered position. A wheel 48 is mounted on the portion 47 and is adapted to travel on the course 10 so as to support the outer end of the arm 46. As stated, the arm 46 is arranged so as to embody a cross section which will provide a track portion 49. The lure 50 has a downwardly protruding stem 51 which supports the roller structure 52 that is adapted to travel on the track portions 49. This structure is such that the lure is free to travel in the arm 48 and therefore due to the downward extent of the arm 46 it is apparent that the lure will ride during operation in a position substantially similar to that indicated in Fig. 1.

As has heretofore been stated, it is advantageous to cause the lure to travel over hurdles and other obstacles in the course and this is accomplished in the following manner. A stud shaft 53 is mounted in the hollowed out portion 44 and the operating member 54 is pivotally mounted thereon. The operating member 54 includes a portion providing a gear segment 55. In the present instance the arm 46 is arranged so as to terminate in a circular member having a gear segment 56 thereon that is adapted to mesh with the gear segment 55. It is to be understood that the arm 46 might be secured to the shaft 45 and in this event the gear segment 56 would be provided on an operating member. The member 54 includes a portion 57 which is disposed at right angles to the portion therein providing the gear segment 55. A slot 58 is provided in the portion 57 and a pin 59 is slidably mounted therein. A solenoid coil 60 is supported in the hollowed out portion 44 by the brackets 61. The armature 62 of the solenoid coil 60 extends forwardly and carries the pin 59. This structure is such that when the solenoid coil is energized the armature is attracted in accordance with the magnitude of the current in said solenoid coil, the drag being provided by the overhanging portion of the arm 46. When the armature 62 is attracted, it is apparent that the pin 59 will move through the slot 58 and will thus rock the member 54 and this movement will be translated through the gear segments 55 and 56 to the arm 46 and said arm will be elevated as stated an amount proportionate to the amount of current in the solenoid coil 60.

A trolley 63 is mounted in the recess portion of the block 19. The bracket 64 that is substantially similar to the bracket 36 and which is mounted in the same manner as the bracket 36, carries a trolley wheel 65 which is adapted to engage the trolley 63. A trolley 65 is mounted in the recess portion of the block 20 and is engaged by the trolley wheel 66 that is carried by the bracket 67 which is also formed and mounted in a manner substantially similar to the bracket 36. The trolleys 63 and 65 are directed to a suitable rheostat 68 which is adapted to control the amount of current drawn from a source of power such as the battery 69. The rheostat 68 controls the amount of current supplied to the solenoid coils 60 in a manner well understood in the art.

Mounted on the portion 43 of the bracket 42 is a lure receiving cage 70 that is adapted to receive the lure 50 when it is desired to terminate the race.

A rheostat 71 is associated with the trolleys 33 and 34 for supplying current to the motive means 72 that is diagrammatically illustrated in Fig. 4. In this manner the speed with which the carriage 23 is propelled around the track structure 14 may be controlled and thus the lure may be kept in the van of the animals which are pursuing it. When, during the running of a race the lure 50 approaches a hurdle sufficient current will be supplied to the solenoid coil 60, the quantity being controlled by the rehostat 68, to elevate the arm 46 to a substantially horizontal position as illustrated by dotted lines in Fig. 1. Thus the lure will be lifted over the hurdle and will cause the animals pursuing it to also vault the hurdle. At the termination of the race the rheostat 68 will be arranged so as to impart sufficient current to the solenoid coil 60 to elevate the arm 46 to a substantially vertical position which is also illustrated by dotted lines in Fig. 1. When the arm 46 is elevated to this position it is apparent that the lure will travel down the arm 46 into the lure receiving cage 70 which will conceal the lure from view and thus the animals will cease running.

It is apparent from the foregoing that I have provided an improved structure whereby I am enabled to expeditiously control the lure from a remote point and the rheostats 68 and 71 will preferably be mounted at a point which affords full view of the course such as the judges' stand. Due to the electromagnetic control of the lure I am enabled to instantaneously control operation thereof and I am also enabled to control the speed with which the lure is propelled.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In combination with a race course and a fence coextensive therewith, a track structure carried by and coextensive with said fence extraneous said course, means for supporting said track structure from said fence, a carriage adapted to travel along said track structure, means for moving said carriage along said track structure, a lure supporting arm carried by said carriage and adapted for swinging movement in a vertical plane over said course, a second carriage carried by and slidably mounted on said arm, a lure carried by said second carriage, a concealing structure carried by said first-named carriage and adapted to receive and conceal said lure when said arm is disposed in a vertical position with the second carriage adjacent the inner end of said arm, and means for moving said arm in a vertical plane.

2. In combination with a race course and a fence coextensive therewith, a track structure carried by and coextensive with said fence extraneous said course, means for supporting said track structure from said fence, a carriage adapted to travel along said track structure, means for moving said carriage along said track structure, a lure supporting arm carried by said carriage and adapted for swinging movement in a vertical plane over said course, a second carriage carried by and slidably mounted on said arm, a lure carried by said second carriage, a concealing structure carried by said first-named carriage and adapted to receive and conceal said lure when said arm is disposed in a vertical position with the second carriage adjacent the inner end of said arm, and means for moving said arm in a vertical plane, said last-named means including a rockable member, a solenoid including an armature connected to said rockable member, and including means providing connection between said arm and said rockable member.

3. In combination with a race course and a fence coextensive therewith, a track structure carried by and coextensive with said fence extraneous said course, means for supporting said track structure from said fence, a carriage adapted to travel along said track structure, means for moving said carriage along said track structure, said last-named means including electric motive means carried by said carriage, means providing circuit to said electric motive means, a lure supporting arm carried by said carriage and adapted for swinging movement in a vertical plane over said course, a second carriage carried by and slidably mounted on said arm, a lure carried by said second carriage, a concealing structure carried by said first-named carriage and adapted to receive and conceal said lure when said arm is disposed in a vertical position with the second carriage adjacent the inner end of said arm, and means for moving said arm in a vertical plane.

4. In combination with a race course and a fence coextensive therewith, a track structure carried by and coextensive with said fence extraneous said course, means for supporting said track structure from said fence, a carriage adapted to travel along said track structure, means for moving said carriage along said track structure, a lure supporting arm carried by said carriage and adapted for swinging movement in a vertical plane over said course, a second carriage carried by and slidably mounted on said arm, a lure carried by said second carriage, a concealing structure carried by said first-named carriage and adapted to receive and conceal said lure when said arm is disposed in a vertical position with the second carriage adjacent the inner end of said arm, means for moving said arm in a vertical plane, said last-named means including a rockable member, a solenoid including an armature connected to said rockable member, and including means providing connection between said arm and said rockable member, and means controlling current input to said coil whereby said arm and said lure may be moved into various positions with respect to the horizontal to simulate jumping action of said lure.

In testimony whereof I affix my signature.

ELMER L. BALLEW.